US 12,450,858 B2

(12) United States Patent
Hagestedt et al.

(10) Patent No.: US 12,450,858 B2
(45) Date of Patent: Oct. 21, 2025

(54) FORMING OR SEPARATING DEVICE, AND METHOD FOR OPERATING SAME

(71) Applicant: ANDRITZ SCHULER PRESSEN GMBH, Goeppingen (DE)

(72) Inventors: Lukas Hagestedt, Esslingen (DE); Robert Vollmer, Bad Boll (DE); Michael Werbs, Stuttgart (DE)

(73) Assignee: ANDRITZ SCHULER PRESSEN GMBH, Goeppingen (DE)

( * ) Notice: Subject to any disclaimer, the term of this patent is extended or adjusted under 35 U.S.C. 154(b) by 425 days.

(21) Appl. No.: 17/676,917

(22) Filed: Feb. 22, 2022

(65) Prior Publication Data

US 2022/0176667 A1    Jun. 9, 2022

Related U.S. Application Data

(63) Continuation-in-part of application No. PCT/EP2020/072111, filed on Aug. 6, 2020.

(30) Foreign Application Priority Data

Aug. 23, 2019    (DE) ............... 10 2019 122 699.6

(51) Int. Cl.
*B30B 15/14*    (2006.01)
*B30B 15/26*    (2006.01)
(Continued)

(52) U.S. Cl.
CPC ............ *G06V 10/25* (2022.01); *B30B 15/148* (2013.01); *B30B 15/26* (2013.01);
(Continued)

(58) Field of Classification Search
CPC ....... B30B 15/26; B30B 15/148; B30B 15/28; G06V 10/25; G06V 10/764; G06V 20/52;
(Continued)

(56) References Cited

U.S. PATENT DOCUMENTS 4,166,369 A * 9/1979 Nakajima ............... B21D 5/02
72/21.1
4,489,578 A * 12/1984 Nagai ..................... F16P 3/144
72/21.1
(Continued)

FOREIGN PATENT DOCUMENTS

AT          508 310 A1    12/2010
DE       692 17 977 T2     7/1997
(Continued)

OTHER PUBLICATIONS

English Translation of DE-10 2018 102 809 A1 (11 pages) (Year: 2024).*

(Continued)

*Primary Examiner* — Jimmy T Nguyen
(74) *Attorney, Agent, or Firm* — Ronald S. Lombard

(57) ABSTRACT

A forming and/or separating device 10 as well as a method for operating the same and particularly a method for checking of an undisturbed operation of the forming and/or separating device 10. The forming and/or separating device 10 is configured to process an initial workpiece 12 in a working area 19 between two tool parts 14, 15 in a chipless forming manner. An image-capturing sensor 20 captures the working area 19 and can capture at least one captured image B during the operation of the forming and/or separating device 10. An evaluation unit 24 compares the at least one captured image B with at least one reference image R or a reference model, if the forming and/or separating device 10 is in a defined operating condition. Based on the comparison it is checked whether a disturbance exists.

18 Claims, 4 Drawing Sheets

(51) Int. Cl.
    *G05B 23/02*    (2006.01)
    *G06V 10/25*    (2022.01)
    *G06V 10/764*   (2022.01)
    *G06V 20/52*    (2022.01)

(52) U.S. Cl.
    CPC ....... *G05B 23/0235* (2013.01); *G06V 10/764* (2022.01); *G06V 20/52* (2022.01)

(58) Field of Classification Search
    CPC ............ G06V 2201/06; G05B 23/0235; G06F 18/24133
    See application file for complete search history.

(56) References Cited

U.S. PATENT DOCUMENTS

| | | | | |
|---|---|---|---|---|
| 6,660,993 | B2 * | 12/2003 | Appleyard | B21D 55/00 |
| | | | | 250/221 |
| 6,752,253 | B2 * | 6/2004 | Fiessler | B21D 55/00 |
| | | | | 250/221 |
| 7,454,935 | B2 * | 11/2008 | Braune | F16P 3/144 |
| | | | | 250/221 |
| 2016/0114380 | A1 * | 4/2016 | Staats | B21D 22/02 |
| | | | | 72/414 |

FOREIGN PATENT DOCUMENTS

| | | | | |
|---|---|---|---|---|
| DE | 20 2015 102 601 U1 | 7/2015 | | |
| DE | 10 2017 110 301 A1 | 11/2018 | | |
| DE | 10 2018 102 809 A1 | 8/2019 | | |
| EP | 1 077 397 A1 | 2/2001 | | |
| EP | 1 688 196 A1 | 8/2006 | | |
| EP | 3731046 A1 * | 10/2020 | ............. | B30B 1/266 |
| GB | 2079670 A * | 1/1982 | ........... | B30B 15/281 |
| WO | WO-9307445 A1 * | 4/1993 | ............... | G01N 3/58 |

OTHER PUBLICATIONS

The International Search Report for the corresponding international application No. PCT/EP2020/072111, dated Nov. 10, 2020 in the German language (2 pages).

The English translation of the International Search Report for the corresponding international application No. PCT/EP2020/072111, dated Nov. 10, 2020 (2 pages).

A German Office Action, dated May 13, 2020, for corresponding German patent application No. 10 2019 122 699.6 to which the present application claims priority, in the German language, (9. pages) with an attached copy of a Google English Translation of the substantive portion of the same (7 pages).

* cited by examiner

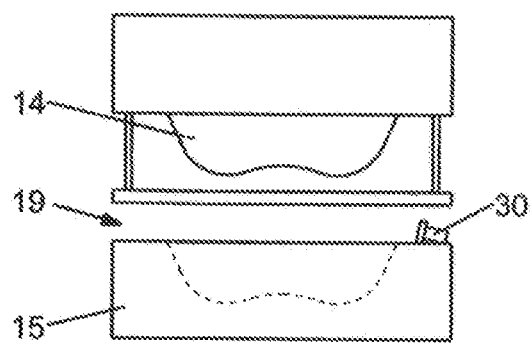
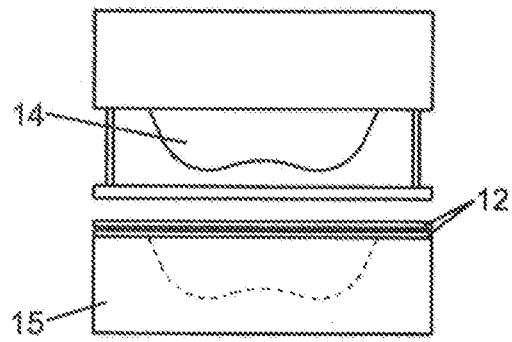
Fig.3        Fig.4
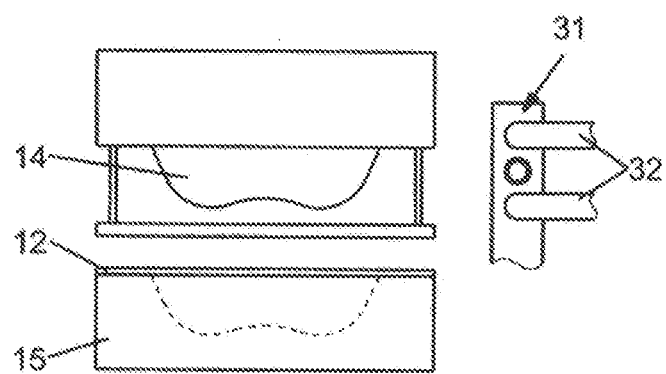
Fig.5
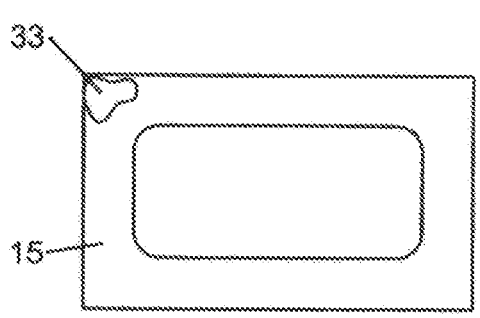
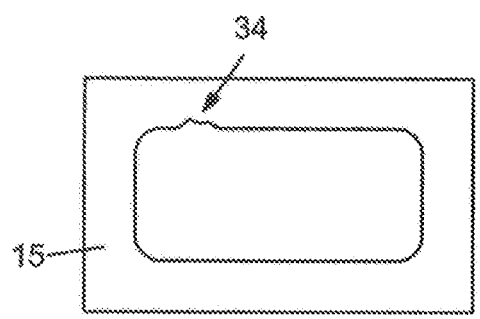
Fig.6        Fig.7

FORMING OR SEPARATING DEVICE, AND METHOD FOR OPERATING SAME

CROSS-REFERENCE TO RELATED APPLICATION

This is a continuation-in-part application of pending international patent application PCT/EP2020/072111 filed Aug. 6, 2020 and claiming the priority of German Patent Application No. 10 2019 122 699.6 filed Aug. 23, 2019. The said international patent application PCT/EP2020/072111 and said German Patent Application No. 10 2019 122 699.6 are both incorporated herein by reference in their entireties as though fully set forth.

BACKGROUND OF THE INVENTION

The invention refers to a forming and/or separating device for processing a workpiece, e.g. a press. The forming and/or separating device is configured to form and/or separate an initial workpiece between tool parts and to thus obtain a processed workpiece. Thereby initial workpieces such as a blank, a strap, a rod, a slug, a round blank, etc. can be processed by means of stamping and/or cutting and/or forming.

DE 10 2017 110 301 A1 describes a forming device having two continuously operating roller bar carpets between which press plates are pressed. For monitoring the roller bar carpets one camera is provided respectively. In doing so, damages of one or multiple rollers can be recognized. Thus, it is a continuously running process during which no cyclic progress with multiple time phases to be monitored occurs. It is therefore not possible to stop the forming device before it transitions into a new phase in order to avoid damage or hazard.

A baling press for pressing of loose material is known from DE 20 2015 102 601 U1. A light source is arranged on a press plate that emits light away from the material to be pressed toward a light receiver. Based on the impingement location of the emitted light on the light receiver, the orientation of the press plate can be determined and corrected if applicable.

The company ifm electronic GmbH of Germany offers an optical sensor for workpiece inspection under the name Efector® dualis. The sensor can recognize object contours and record object surfaces and count the pixel of the recorded object area. In addition to this, ifm electronic also offers vision sensors with which, depending on the sensor type, QR or bar codes can be detected in addition to the objects mentioned above or with which a three-dimensional object recognition is possible. Thereby a double sheet metal recognition in automatic gripper systems shall be possible.

During the operation of a forming and/or separating device different disturbances can occur. Such disturbances can be caused by errors during supply of workpieces, during removal of workpieces due to erroneous installation after maintenance, etc. Starting from the prior art it is an object of the present invention to provide a forming and/or separating device and a method for operating the same by means of which different disturbances in the context of the operation of the press can be determined reliably in a simple manner.

SUMMARY OF THE INVENTION

This object is solved by means of a forming and/or separating device and a method according to the features of the claims. The invention refers to a forming and/or separating device 10 as well as a method for operating the same and particularly a method for checking of an undisturbed operation of the forming and/or separating device 10. The forming and/or separating device 10 is configured to process an initial workpiece 12 in a working area 19 between two tool parts 14, 15 in a chipless forming manner. An image-capturing sensor 20 captures the working area 19 and can capture at least one captured image B during the operation of the forming and/or separating device 10. An evaluation unit 24 compares the at least one captured image B with at least one reference image R or a reference model, if the forming and/or separating device 10 is in a defined operating condition. Based on the comparison it is checked whether a disturbance exists.

The forming and/or separating device comprises a first tool part and a second tool part as well as a drive. The drive is configured to move the two tool parts relative to one another. Thereby the first tool part and/or the second tool part can be moved, particularly toward the respectively other tool part or away from the other tool part. During and due to this relative movement, an initial workpiece arranged in a working area can be processed between the tool parts, for example by means of stamping, cutting or forming. The forming and/or separating device can be configured to carry out any forming method according to DIN 8580.

The forming and/or separating device comprises in addition at least one image-capturing sensor, e.g. a camera. The at least one image-capturing sensor is configured to capture at least one image. Preferably the captured image or at least one of the captured images shows one or multiple areas at or adjacent to the forming and/or separating device, particularly

- the working area and/or
- at least one connection area with line connections for electrical and/or fluidic lines and/or
- a chute or a slide for waste parts and/or
- accesses in a casing of the forming and/or separating device, such as doors, flaps and openings and/or
- sections for supply of initial workpieces into the working area and for removal of processed workpieces out of the working area and/or
- a set-up area of the forming and/or separating device.

A line camera, a 2D-camera or a 3D-camera can be used as camera. The camera can also be configured to capture light in the non-visible wavelength range, e.g. in the infrared range.

An illumination unit can be provided for illuminating the working area that can emit light in a single predefined wavelength range or in an adjustable variable wavelength range or in one of multiple different selectable wavelength ranges, e.g. white light and/or blue light and/or infrared light. The illumination device can also be configured to emit polarized light. The evaluation unit can control the illumination unit. The illumination unit can be configured to at least illuminate the working area at least during capturing of the at least one image or constantly.

An evaluation unit of the forming and/or separating device is communicatively connected with the at least one image-capturing sensor. The evaluation unit is configured to determine during the operation of the forming and/or separating device whether a defined operating condition of the forming and/or separating device has been reached. Multiple operating conditions can be predefined, wherein the forming and/or separating device can be in exactly one of these predefined operating conditions at one monitoring point of time. If the evaluation unit determines that one of the defined operating conditions or that the operating condition is reached, the at least one captured image that has been captured by the at least one image-capturing sensor in this defined operating condition is compared with at least one reference image and/or a reference model that is assigned to this defined operating condition. For this one or more reference images and/or the reference model can be stored in the evaluation unit or a separate memory, wherein at least one reference image or reference model is assigned to each predefined operating condition. By means of comparison of the at least one captured image with the at least one reference image and/or the reference model it is checked whether a disturbance is present.

The determination whether a predefined operating condition has been reached can be carried out in different manners. For example, it can be checked by means of comparison of the at least one actually captured image with one or multiple reference images whether a predefined operating condition has been reached. For example, if it can be recognized in the captured image that no initial workpiece for the processing is present and the two tool parts have a minimum distance from one another, it can be determined that the forming and/or separating device is ready for supply of a new initial workpiece.

In addition or as an alternative, a condition signal can be submitted to the evaluation unit also based on which one or multiple of the predefined operating conditions can be determined. The at least one condition signal can be submitted from the control device and/or at least one additional sensor (e.g. position sensor, pressure sensor, force sensor, vibration sensor, temperature sensor . . . ) of the forming and/or separating device to the evaluation unit. This at least one additional condition signal can be used in addition or as an alternative to the determination of one or multiple predefined operating conditions, also during comparison of the at least one captured image with the at least one reference image and/or the reference model in order to check whether a disturbance is present.

The at least one additional condition signal is a signal characterizing the actual condition and/or desired condition of the forming and/or separating device. For example, sensor signals of sensors or control signals or an actuator of the forming and/or separating device can be used as condition signals. The number of the condition signals submitted to and considered by the evaluation unit is arbitrary.

The condition signal and/or the at least one further condition signal can, for example, characterize a distinct point of time or a distinct method condition within a repeated cycle.

In an embodiment the evaluation unit can also be part of the control unit of the forming and/or separating device.

This comparison of the at least one captured image with the at least one reference image and/or the reference model can be carried out by means of image processing algorithms, for example. During this comparison all of the image contents or only parts of the image contents can be compared with each other. Deviations of the at least one captured image from the respective at least one reference image can be evaluated and therefrom it can be extrapolated to disturbance. The image contents can be compared with each other by pixel-to-pixel comparison, such that deviations between the at least one captured image and the at least one reference image can be determined simply and quickly. In addition or as an alternative to image processing algorithms, also machine learning can be used. Based on machine learning, examples for disturbances and/or examples for the non-disturbed normal operation can be learned based on exemplary data for each defined operating condition and the at least one captured image can be compared with the reference model. The exemplary data can be images and/or semantic data and/or other data that characterize a disturbance or a non-disturbed condition.

For example one or particularly also multiple different disturbances can be determined due to the comparison. It is particularly possible to determine one or more of the following disturbances:

1) During the monitoring of the regular progress of the forming and/or separating process:
   Erroneous put-down position or pick-up position of the initial workpiece or the process workpiece between the two tool parts;
   More initial workpieces are present between the two tool parts than specified;
   An error occurs during transfer of the initial workpiece or the processed workpiece into or out of the working area (blocking in the belt feed, gripper error of workpiece individual parts, . . . );
   The orientation and/or position of the initial workpiece is incorrect (e.g. tilted, twisted, displaced);
   Error of the tool initial position prior to insertion of the workpiece (e.g.: centering elements and/or ejection elements and/or movable tool components are not their desired position or are damaged or are missing);
   Erroneous condition (e.g. presence/missing) of the initial workpiece prior to the processing;
   Erroneous condition (e.g. presence/missing) of the processed workpiece after processing;
   Missing and/or inconsistent connections of lines, such as medium hoses or electrical cables;
   The present tool parts are unfitting compared with a control data set in the control device of the forming and/or separating device;
   At least one of the tool parts is not correctly installed or orientated (e.g. wrong installation position or orientation);
2) Abnormal events during the processing;
   One or more non-fixed or spontaneously released components of the tool parts are in undefined position;
   Foreign bodies in the working area
      Elements violently torn off the tool parts
      Leakages at the at least one tool part
      Scrap parts from separating processes that have not been correctly discharged or that have fallen into the working area (optionally fallen down also from a previous processing stage
      Foreign bodies left behind by a person (e.g. tool, glove, . . . )

By means of the forming and/or separating device according to the invention or the method according to the invention, it can thus also be determined whether foreign bodies are present in the working area. Foreign bodies such as fragments of a tool or workpiece, fastening elements, tools, centering elements or the like can be determined.

Another possibility provided by the invention is that static connections or connectors, e.g. electrical connections, fluidic connections or mechanical connections can be checked whether the connection has been correctly established. For example, in the context of a repair, a tool change or a maintenance it could have been forgotten to reestablish one or more connections correctly. A free connector to which no line (electrically and/or fluidically) is connected—unlike illustrated in the reference image and/or described in the reference model—can be determined as disturbance.

In case one of the tool parts and/or the forming and/or separating device comprises fluidic and particularly hydraulic components, liquids accumulated in the working area of liquids dropping or flowing through the working area can be recorded and if applicable determined as disturbance.

Depending on the kind of disturbance, a suitable measure can be initiated by the method according to the invention or the forming and/or separating device according to the invention. For example, outputting a respective indication to a user and/or as an option stopping the operation of the forming and/or separating device apart thereof.

In a preferred embodiment each image-capturing sensor is a camera. Depending on the size and the kind of working area, one single camera can be sufficient.

It is preferred, if the reference images are respectively captured by the same image-capturing sensor and/or from the same angle of view and/or having the same image area as the at least one captured image with which the respective reference image is compared. In doing so, the comparison of the images by means of the image processing algorithm is simplified.

The forming and/or separating device can be a cyclically operating press. The press can be a hydraulic press, an electromechanical press or an energy related machine tool, such as a spindle press or a hammer. Each cycle or press cycle preferably comprises multiple and particularly at least three phases: A first phase during which an initial workpiece is supplied, an following second phase during which the initial workpiece is processed by means of a forming method in order to obtain the processed workpiece and a third phase during which the processed workpiece is removed from the forming and/or separating device. These phases are carried out exactly one time during each press cycle and are cyclically repeated. For example, a press ram of the press can carry out one complete stroke movement during each press cycle: Starting from a starting position that a starting point of time of the first phase (for the supply of the initial workpiece) the press ram having the first tool part can first move in an upper reversal point, from there toward a second tool part in a lower reversal point and again back into the starting position to the starting point of time. During each press cycle multiple defined operating conditions can be reached in a sequence.

Typically the press can be configured in that the drive is configured to move the two tool parts in a stroke direction toward each other and away from each other. At least one of the tool parts can be in motion such that during a press cycle no standstill phase occurs. As an alternative, during one or multiple phases also a standstill of both tool parts may occur.

In a preferred embodiment the evaluation unit is configured to determine the readiness condition for the supply of an initial workpiece into the forming and/or separating device as one defined operating condition of the forming and/or separating device. This readiness condition for the supply of an initial workpiece can be the starting point of time for a press cycle.

Moreover, the evaluation unit can be configured to determine the readiness condition for the forming of an initial workpiece in a processed workpiece as a defined operating condition of the forming and/or separating device.

In addition or as an alternative, the evaluation unit can be configured to determine the readiness condition for the removal of a processed workpiece out of the forming and/or separating device as a defined operating condition of the forming and/or separating device.

In addition or as an alternative, the evaluation unit can be configured to determine a point of time at which separated waste parts shall have been removed out of the forming and/or separating device as one defined operating condition of the forming and/or separating device. For example, it can be checked thereby whether waste parts have been slided down a scrap slide at the point of time such that it is empty again.

At least one reference image and/or a reference model can be assigned to each of these defined operating conditions that shows the undisturbed operating condition and serves as reference for the comparison with the at least one captured image. In addition or as an alternative, the reference model can be assigned to each of these defined operating conditions with which the at least one captured image is compared.

It is advantageous, if the evaluation unit is configured to calculate an indicator value during comparison of the at least one captured image with the at least one reference image. The indicator value is particularly characteristic for the deviation between the at least one captured image and the at least one reference image. In order to check whether a disturbance is present, the indicator value can be compared with a predefined threshold, for example. Thereby a disturbance can be determined, for example, if the determined indicator value exceeds the threshold. For example, the indicator value can be calculated based on to what extent the at least one captured image is identical with the at least one reference image. The deviations between the at least one captured image and the at least one reference image can be weighted depending on their spatial position in the image and/or depending on the kind of deviation, in order to obtain an indicator value. As kind of deviation, for example, an evaluation can be carried out whether differences in the compared images have been created by a shadow or light incidence or whether a foreign body has been recognized in the image. Deviations that are for example only traced back to the illumination can be weighted low, whereas deviations that are indicative of a foreign body in the working area effect a high indicator value such that a disturbance is determined. Also the number of pixels that are different between the at least one captured image and the at least one reference image can be included in the calculation of the indicator value.

Alternatively to this, it is also possible to calculate an indicator value that indicates a coincidence between the captured image or image area and a reference image or reference image area instead of the deviation and indicates a disturbance, if the indicator value describing the coincidence is less than a predefined threshold that characterizes a minimum coincidence.

The evaluation unit can be configured to only evaluate an image area or multiple image areas in the captured image and to only use this image area or these image areas for the comparison with the reference image. In the reference image one or multiple corresponding image areas are used for the comparison. In doing so, the required computing capacity can be reduced. In addition, one or more image areas can be selected that show, for example, one of the tool parts or line connectors for these tool parts or the forming and/or separating device, whereby less relevant image information can be skipped.

Preferably the at least one captured image is divided into a multiplicity of adjoining or partly overlapping image areas for comparison. The evaluation unit can be configured to carry out a comparison for each image area with an assigned reference image area of the reference image and particularly to calculate an indicator value. Thus, not an entire image is evaluated with regard to a deviation compared with a reference image, but each image area separately. In doing so, the sensitivity with regard to deviations and thus also disturbances can be increased. Moreover, the possibility exists to locate a disturbance.

In an embodiment the evaluation unit can be configured to identify the image area in the at least one captured image that has the lowest coincidence with the respectively assigned reference image area of the reference image, e.g. the smallest indicator value, if the indicator value characterizes the coincidence. This smallest indicator value is then compared with a predefined threshold. If the smallest indicator value is larger than the threshold, it can be concluded that no disturbance is present. If this is not the case, a disturbance is determined in the respective image area. Subsequently, the indicator values can be further compared with the threshold as an option in order to identify potential additional disturbances or a disturbance that extends over multiple image areas (e.g. a larger interfering object).

The determination of an indicator value can be carried out based on known image processing algorithms, e.g. by means of image comparison models and/or image comparison algorithms such as correlation-based models and/or segmentation algorithms and/or trainable models or self-learning models, e.g. neural networks.

The evaluation unit can in addition be configured to calculate a separate indicator value for each image area and to compare it with the threshold. It is also possible to assign different thresholds to different image areas. In this configuration of the invention the sensitivity can be improved. It is also possible to locate disturbances in the image and thus in the working area. For locating, models of machine learning can be optionally used for semantic segmentation.

It is advantageous, if the evaluation unit is configured to carry out a detection of the image area or the image areas, the evaluation as well as the creation of an indication whether a disturbance exists to the control unit of the forming and/or separating device and/or a user of the forming and/or separating device within a predefined maximum duration. The maximum duration is the duration that is available at most for stopping the forming and/or separating device before endangering persons and/or a damage of the forming and/or separating device and/or the tools and/or the components and/or the transfer device occurs. A damage can be caused due to a collision, for example.

In all of the embodiments a machine learning can be used in the context of the comparison of the images in addition or alternatively to image processing algorithms. Based on the machine learning, examples for disturbances and examples for the non-disturbed normal operation can be learned based on exemplary data and particularly exemplary images for each defined operating condition and the captured images can be compared with a reference model.

BRIEF DESCRIPTION OF THE DRAWINGS

Advantageous embodiments of the invention can be derived from the claims, the description and the drawings. In the following, preferred embodiments of the invention are explained in detail based on the attached drawings. The drawings show:

DETAILED DESCRIPTION OF THE INVENTION

Figure 1:
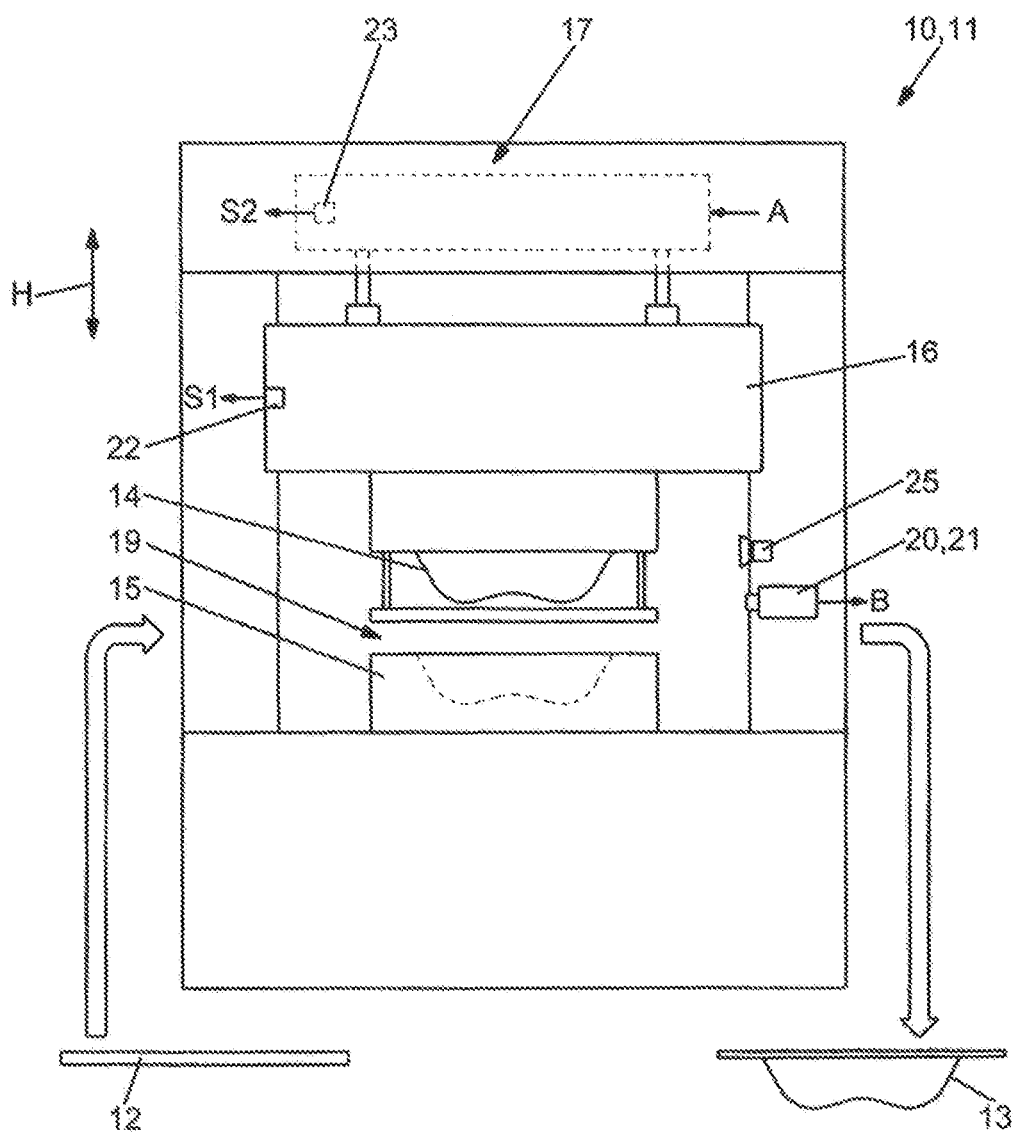
FIG. 1 a schematic block-diagram-like illustration of an embodiment of a forming and/or separating device, FIG. 2 a flow diagram of an embodiment of a method for operating the forming and/or separating device, FIGS. 3 to 7 a schematic illustration of disturbances in the working area in each case that can be determined by means of the invention and FIG. 8 a schematic illustration of an image subdivided into multiple image areas as well as a reference image subdivided into multiple corresponding reference image areas, whereby individual image areas are separately compared with the respectively assigned reference image area.
Figure 1:
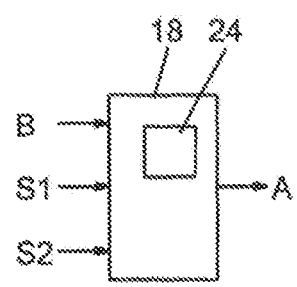

In FIG. 1 a forming and/or separating device 10 is highly schematically illustrated that is configured as press 11. The press 11 is configured to form an initial workpiece 12, e.g. a sheet blank, into a processed workpiece 13. The forming process is carried out in a cyclic manner according to the example. During each press cycle an initial workpiece 12 is supplied to the press 11 during a first phase, subsequently processed during a second phase by means of a chipless forming method such that the processed workpiece 13 is created and is finally removed from the press 11 in a third phase. The forming and/or separating device 10 configured as press 11 has a first tool part 14 and a second tool part 15. The first tool part 14 is arranged on a press ram 16 that is movably arranged in a stroke direction H and thus defines an upper tool so-to-speak. The second tool part 15 is arranged on a press table and is immovable according to the example. As an alternative to this, the second tool part 15 could also be arranged on a die cushion and could be moved for forming in stroke direction H by means of a die cushion drive.

Due to a relative movement between the tool parts 14, 15, they can act and process, e.g. form, the workpiece 13 to be processed from opposite sides.

For moving the press ram 16 with the first tool part 14 in stroke direction H, the press 11 comprises a drive 17. The drive 17 is controllable by means of a control device 18. The control device 18 can create a drive control signal A for drive 17, for example.

The initial workpiece 12 is supplied into a working area 19 between the first tool 14 and the second tool 15 is processed there and the created processed workpiece 13 is subsequently removed from the working area 19. Devices for supplying and for removing the workpieces 12, 13 are known per se and can be realized by gripping devices, for example. Likewise the supply and the removal of the workpieces can be carried out, for example in progressive tools in that the workpieces are connected with each other and the entire sheet strip with all workpieces is fed. The devices for supply and removal of the workpieces 12, 13 are not illustrated.

The forming and/or separating device realized by press 11 has in addition at least one image-capturing sensor 20 that is realized by a camera respectively according to the example. The camera 21 is configured to record the working area 19 and particularly the first tool part 14 and the second tool part 15 at least partly at its sections facing one another. The camera 21 is configured to capture at least one captured image B. The camera 21 is communicatively connected with an evaluation unit 24 such that the at least one captured image B can be submitted to the evaluation unit 24.

According to the example, the evaluation unit 24 is part of the control device 18. As an alternative to this, the evaluation unit 24 can also be realized separately.

As an option, an illumination unit 25 can be present for illuminating the working area 19 that can emit light in one single predefined wavelength range or in an adjustable variable wavelength range or in one of multiple different selectable wavelength ranges, for example white light and/or blue light and/or infrared light. The illumination unit 25 can be configured to illuminate the working area 19 at least during the recording of the at least one image B or permanently.

As it is illustrated in FIG. 1 by way of example, press 11 can comprise additional sensors, e.g. a position sensor 22 that creates a first sensor signal S1 as well as a drive sensor 23 that creates a second sensor signal S2 characterizing the drive condition of the drive 17. The second sensor signal S2 can characterize the rotation position or the rotation movement of a motor or a shaft of drive 17, for example. The first sensor signal S1 characterizes a ram position in stroke direction H in the embodiment.

The control device 18 controls the operation of the forming and/or separating device 10 or press 11. The position sensor 22 and the drive sensor 23 are communicatively connected with control device 18 and as an option also with evaluation unit 24 such that the sensor signals S1, S2 can be submitted to the control device 18 or also to the evaluation unit 24. It is understood that alternatively also other or in addition additional sensors can be present. Additionally or alternatively, sensors, particularly image-capturing sensors and cameras, can be directly connected to the evaluation unit 24.

The evaluation unit 24 does not have to be part of the control device 18, but can also be realized individually and can be communicatively connected with the control device 18, for example.

The evaluation unit 24 can use at least one condition signal for the determination of a defined operating condition and/or during evaluation of images. Signals can be used as condition signals that characterize the actual condition or the desired condition of the forming and/or separating device 10. For example, the sensor signals S1, S2, the control signal A and/or at least one other sensor signal, control signal or desired value can be used as condition signal.

The evaluation unit 24 is configured to check during the operation of the forming and/or separating device 10 whether a disturbance exists. The evaluation unit 24 can determine one disturbance according to the example or also multiple different disturbances, e.g. two or more of the following disturbances:

- An erroneous put-down position of the initial workpiece 12 or an erroneous take-up position of the processed workpiece 13 between the two tool parts 14, 15;
- The presence of more initial workpieces 12 between the two tool parts 14, 15 than allowed;
- Errors during transfer of the initial workpiece 12 or the processed workpiece 13 into or out of the working area (blocking, collision, a workpiece falling off a gripper, etc.);
- Incorrect orientation and/or position of the initial workpiece 12 (e.g. positioning and/or orientation errors);
- Incorrect initial position of the tool parts 14, 15 prior to insertion of an initial workpiece (e.g. erroneously positioned centering elements, ejection elements, movable tool components, . . . );
- Missing initial workpiece 12 in a readiness condition for forming the supplied initial workpiece 12;
- Deformed or incorrect components of the transfer device for transfer of workpieces, such as non-opened grippers, bent arms or blades, damaged suckers etc.;
- Incorrect gripped or held workpieces during transfer movement;
- A processed workpiece 13 is present in a readiness condition for supplying of an initial workpiece 12;
- Erroneously processed workpiece that, for example, has not been completely formed or contains cracks or has been pulled in in a tilted manner or has been irregularly formed;
- Incorrectly established line connections, such as media hoses or electrical cables;
- Inconsistency between the present tool parts 14, 15 and a control data set in the control device 18;
- Wrong installation position of at least of one of the tool parts 14, 15 (e.g. wrong installation position or orientation);
- Presence of one or multiple non-attached or spontaneously released components of the tool parts 14, 15 in undefined position;
- Incorrect workpiece transfer by means of a transfer device, particularly incorrect belt feed in progressive tools, e.g. if the sheet strap got caught within the tool;
- Two present initial workpieces, e.g. two sheet plates, if two initial workpieces have been collectively taken and supplied by a transfer device (e.g. blank feeder);
- Incorrect lifting of the strap by means of the strap lifter, e.g. in progressive tools;
- Presence of a foreign body in the working area, for example:
  - An element ripped down violently from a tool part 14, 15;
  - A fluid pool on at least one tool part 14, 15, e.g. due to a leakage;
  - A separated waste part after a separation method that was not correctly discharged or that entered into the working area 19 from an adjacent forming and/or separating device;
  - A foreign body left behind by a person (e.g. manual tool, glove, . . . ).

Figure 2:
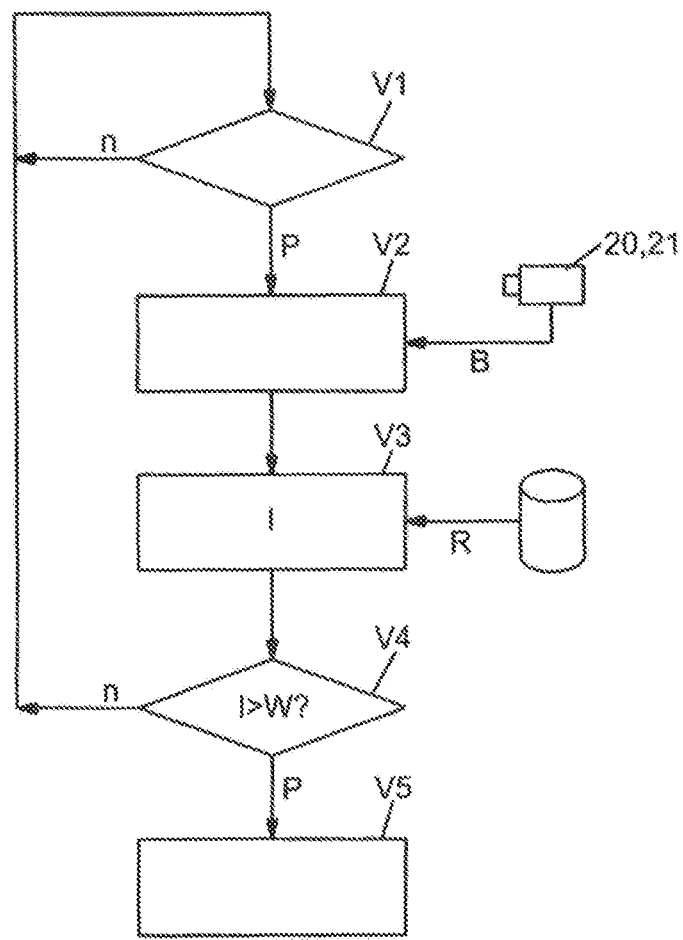

An exemplary method progress in the context of this operation is illustrated in FIG. 2 in the form of a flow diagram and serves to determine or to check whether a disturbance is present or whether the operation runs in an undisturbed manner.

First, in a first method step V1 it is checked whether the forming and/or separating device 10 or press 11 is in a defined operating condition. The number of defined operating conditions can vary. In the embodiment three defined operating conditions are preset in the control device 18 or evaluation unit 24: A readiness condition for supplying an initial workpiece 12, a readiness condition for processing and according to the example forming the supplied initial workpiece 12, as well as a readiness condition for removal of the processed workpiece 13 after completion of the processing or forming process. The determination of the defined operating conditions can be carried out by evaluation of one or more signals of the control device 18 and/or by evaluation of one or more sensor signals. The first sensor signal S1 of the position sensor 22 or the second sensor signal S2 of the drive sensor 23 or further sensors can be used as sensor signals.

If in the first method step V1 is determined that a defined operating condition is actually not present (branch n from the first method step V1), the check in the first method step V1 is continued until it is determined that one of the defined operating conditions has been reached (branch p from the first method step V1). Then the method is continued in the second method step V2.

In the second method step V2 at least one captured image B of camera 21 is selected that can be assigned to the defined operating condition, e.g. the readiness condition for supplying an initial workpiece 12 or the readiness condition for forming the initial workpiece 12 or the readiness condition for removal of the processed workpiece 13.

In a third method step V3 at least one reference image R is selected from a memory or a data base that is assigned to the actually defined operating condition. The at least one captured image B and the at least one reference image R are compared with one another and it is checked based on the comparison whether a disturbance of the operation of the forming and/or separating device 10 or press 11 exists. For example, foreign bodies erroneously positioned workpieces, workpieces that comprise errors like cracks, for example, missing line connections, leakages, damages on a tool part 14, 15 or the like can be identified due to the comparison. For this the at least one captured image B and the at least one reference image R can be compared in their entirety. Alternatively, it is also possible to only select one or multiple image areas in the at least one captured image B and in the at least one reference image R and to compare the image areas with each other that correspond to one another in a captured image B and a reference image R. For example, such image areas can be compared with each other in which parts of the tool parts 14, 15 can be recognized. Background information in the image can be ignored.

In the third method step V3 an indicator value I is calculated based on the comparison that characterizes the deviation between the at least one captured image B and the at least one reference image R. Thereby it is possible to calculate one single indicator value I as comparison result or to determine one indicator value I for each comparison of two image areas in a captured image B and a corresponding reference image R respectively.

The greater and/or the more relevant the deviation between the at least one captured image B and the at least one reference image R, the greater is the calculated indicator value I.

In a fourth method step V4 it is checked whether the indicator value I exceeds a predefined threshold W. If this is the case (branch p from the fourth method step V4), the method is continued in a fifth method step V5. Otherwise (branch n from the fourth method step V4), the method starts again with the first method step V1. If multiple indicator values I have been calculated, each indicator value I can be compared with an assigned threshold W. If the indicator value I characterizes the coincidence between the at least one captured image B and the at least one reference image R instead of the deviation, then it is checked in the fourth method step V4 whether the indicator value I is below a predefined threshold W.

Figure 8:
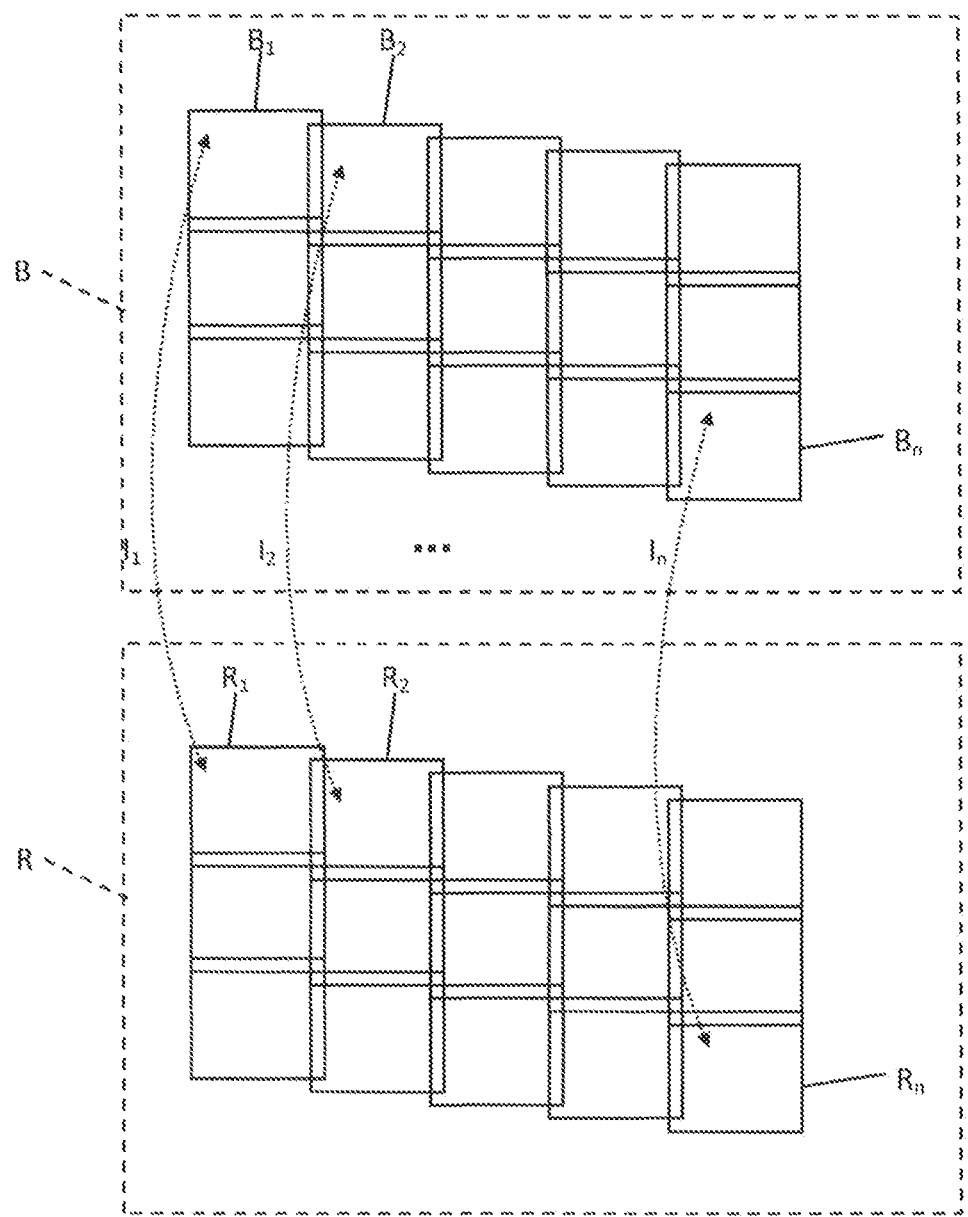

In a preferred embodiment of the method the captured image B is subdivided in a multiplicity of image areas $B_1$ to $B_n$. The directly adjacent image areas $B_1$ to $B_n$ are preferably arranged in an overlapping manner, as schematically illustrated in FIG. 8. Depending on which defined operating condition has been determined, also in one image B only one specific image section can be checked and divided into multiple image areas $B_1$ to $B_n$, as schematically illustrated in FIG. 8. Each image area $B_1$ to $B_n$ is compared with an assigned reference image $R_1$ to $R_n$ and thereby one indicator value $I_1$ to $I_n$ is calculated in each case (third method step V3). Subsequently, in the fourth method step V4 the largest indicator value $I_{max}$ can be determined first that characterizes the image area $B_i$, where (i=1, 2, 3, ... n), having the greatest deviation compared with the assigned reference image $R_i$, where (i=1, 2, 3, ... n). If this maximum indicator value $I_{max}$ is not greater than the threshold W (branch n from the fourth method step V4), no disturbance exists. Otherwise disturbance has been determined (branch p from the fourth method step V4) and the method is continued in the fifth method step V5. If the indicator value characterizes the coincidence between the at least one captured image B and the at least one reference image R instead of the deviation, then a minimum indicator value is used instead of the maximum indicator value.

The disturbance can be located during the comparison of individual image areas. In addition, the sensitivity with regard to deviations is the greater, the more image areas and the smaller the image areas are into which the image B is divided and/or the more the image areas overlap.

In the preferred embodiment the image areas $B_1$ to $B_n$ overlap in order to be able to better identify deviations or disturbances that are exactly located at the position at which two image areas $B_1$ to $B_n$ transition into one another. If an image B would only be subdivided into image areas that contact one another without overlapping, deviations at the edge of an image area and in the transition to the adjacent image area would be much more difficult to determine.

Progressing modifications in the environmental area that the camera captures, for example due to an increasing contamination of the tool, a changing illumination situation, etc. influence the at least one indicator value I in the captured image B or at least in an image area $B_1$ thereof. Such modifications are, however, usually slow (e.g. increasing contamination of a tool) compared with the recording speed of subsequent images B or can influence all pixels or image areas of the image concurrently (sudden switching on or switching off of an illumination). These effects can be determined and can be considered during a threshold comparison. If for example the same environmental area is represented by multiple images B, an indicator value for the at least one image area $B_i$ or for the entire image B changing from image to image, i.e. increasing or decreasing, can be determined. In such a situation it can be advantageous to adapt, i.e. to increase or decrease, the threshold, e.g. in the same degree in which the indicator value changes. Moreover, a multiplicity of calculations can be executed based on the at least one indicator value I, such as analysis of the discrete mathematical deviation of the at least one indicator value I for the at least one image B over the recording points of time.

An indication is created in the fifth method step V5 that indicates that a disturbance has been determined. The indication can be output in any arbitrary manner, e.g. optically or acoustically. It can be output directly on the control device of the forming and/or separating device 10 or press 11 or remote therefrom in a control center. In the fifth method step V5 the further operation of the forming and/or separating device 10 or press 11 can be stopped in addition or as an alternative to outputting the indication, such that the disturbance can be eliminated before the operation is resumed and particularly before a damage on the forming tool or the forming device or the transport or transfer device or the workpiece occurs. After elimination of the disturbance and resumption of operation, the method starts again with the first method step V1.

In the exemplary method illustrated in FIG. 2 at least one captured image B is compared with at least one reference image R. Thereby image processing algorithms are used in order to recognize image components such as edges and/or surfaces. Based on the comparison of the at least one captured image B with the at least one reference image R or corresponding image areas, it can be concluded whether the actual operating condition represented by the at least one captured image B is coincident with the undisturbed operating condition that is characterized by the at least one reference image R. The larger or the more relevant the identified deviations, the greater is the calculated at least one indicator value I.

Alternatively or additionally to this approach and to the use of the at least one reference image R, also a reference model can be used for the comparison with the at least one captured image B. The reference model can be created by means of machine learning, for example. For this, exemplary data or other information can be input that characterize the undisturbed operation or the presence of a disturbance, for example. By means of machine learning a reference model can be created therefrom. The at least one captured image B can be evaluated and compared with the reference model such that an undisturbed or disturbed operation can then be concluded.

In FIGS. 3 to 7 different situations are schematically illustrated that can be recognized according to the invention and can be identified as disturbance. In the situation illustrated in FIG. 3, a foreign body 30 is present in the working area 19 between the tool parts 14, 15. The foreign body 30 can be an attachment means, a tool, fragments of a centering pin of a tool part 14, 15 or the like.

In the situation illustrated in FIG. 4, unintentionally two initial workpieces 12 have been placed on the second tool 15. Also this condition is determined as disturbance.

A connection area 31 for multiple lines 32 is schematically illustrated in FIG. 5. For example, the connection area 31 can be part of a tool part 14, 15 or the forming and/or separating device 10 and can be located in the image capture area of camera 21. The lines 32 can be fluidic lines and/or electrical lines. In FIG. 5 it is schematically illustrated that a connector in the connection area 31 is not connected with a respective line 32. The missing line 32 can be recognized and evaluated as being a disturbance.

In the schematic illustration in FIG. 6 the second tool part 15 is illustrated in a top view. A fluid pool 33 is schematically apparent on the second tool part 15. Such a fluid pool 33 can be created due to a leakage. Also this situation can be evaluated as disturbance.

By way of example, another disturbance case is illustrated in FIG. 7. Here, for example, the second tool part 15 is damaged at a location 34. An edge of the second tool part 15 has been chipped at this location 34. Also such a damage can be recognized as disturbance.

The examples explained based on FIGS. 3 to 7 are not conclusive. Also further situations can be recognized as disturbance. For example, a disturbance can also be present, if in the readiness condition for the insertion of an initial workpiece 12 the processed workpiece 13 from the previous cycle is still present in the working area 19.

The disturbances that can be identified can be related with the supply of the initial workpiece 12, the removal of the processed workpiece 13, the condition of the tool parts 14, 15, the mechanical or fluidic coupling thereof with the forming and/or separating device 10 as well as the electrical, fluidic or mechanical connections of the forming and/or separating device 10 themselves. Reaching a defined operating condition of the forming and/or separating device 10 is used as trigger event in order to carry out a check on a disturbance. In the preferred embodiment the start of one of the three phases during a press cycle is preset as defined operating condition respectively. Alternatively, also more or less operating conditions can be defined.

The invention refers to a forming and/or separating device 10 as well as a method for operating the same and particularly a method for checking of an undisturbed operation of the forming and/or separating device 10. The forming and/or separating device 10 is configured to process an initial workpiece 12 in a working area 19 between two tool parts 14, 15 in a chipless forming manner. An image-capturing sensor 20 captures the working area 19 and can capture at least one captured image B during the operation of the forming and/or separating device 10. An evaluation unit 24 compares the at least one captured image B with at least one reference image R or a reference model, if the forming and/or separating device 10 is in a defined operating condition. Based on the comparison it is checked whether a disturbance exists.

LIST OF REFERENCE SIGNS 10 forming and/or separating device
11 press
12 initial workpiece
13 processed workpiece
14 first tool part
15 second first tool part
16 press ram
17 drive
18 control device
19 working area
20 image-capturing sensor
21 camera
22 position sensor
23 drive sensor
24 evaluation unit
25 illumination unit
30 foreign body
31 connection area
32 line
33 fluid pool
34 location at the second tool part
A drive control signal
B captured image
$B_i$ image area (i=1 to n)
H stroke direction
R reference image
$R_i$ reference image area (i=1 to n)
S1 first sensor signal
S2 second sensor signal
V1 first method step
V2 second method step
V3 third method step
V4 fourth method step
V5 fifth method step

What is claimed is:

1. A forming and/or separating device (10) configured to operate cyclically comprising:
   a first tool part (14) and a second tool part (15),
   a drive (17) that is configured to move the two tool parts (14, 15) relative to one another in order to process an initial workpiece (12) arranged in a working area (19) between the two tool parts (14, 15), in order to obtain a processed workpiece (13),
   at least one image-capturing sensor (20) for capturing at least one image (B),
   an evaluation unit (24) that is communicatively connected with the at least one image-capturing sensor (20), wherein the evaluation unit (24) is configured to determine during operation of the forming and/or separating device (10) whether a defined operating condition of the forming and/or separating device (10) has been reached and to compare the at least one image (B) captured in the defined operating condition by the at least one image-capturing sensor (20) with an assigned stored reference image (R) and/or reference model and to check based on the comparison whether a disturbance exists, wherein in case of an existing disturbance the evaluation unit (24) is configured to create an indication to a control unit (18) of the forming and/or separating device (10) in order to stop the forming and/or separating device (10), wherein the evaluation unit (24) is configured to carry out the capturing of the at least one image (B), the evaluation of the at least one image (B) as well as the creation of an indication to a control unit (18) of the forming and/or separating device (10) and/or a user, whether a disturbance exists, within a predefined maximum duration, and, wherein the maximum duration is the duration that is the most available in order to stop the forming and/or separating device (10) before endangering a person and/or a damage of the forming and/or separating device and/or a tool of the forming and/or separating device and/or a workpiece and/or a transfer device occurs.

2. The forming and/or separating device according to claim 1, wherein each image-capturing sensor (20) is realized by a camera (21).

3. The forming and/or separating device according to claim 1, wherein the evaluation unit (24) is configured to determine two or more different disturbances by means of the comparison of the at least one captured image (B) with the stored reference image (R) and/or reference model.

4. The forming and/or separating device according to claim 1, wherein each cycle of the cyclically operating forming and/or separating device (10) comprises a phase during which the initial workpiece (12) is supplied, a phase during which the initial workpiece (12) is processed and a phase during which the processed workpiece (13) is removed, wherein two or more phases can overlap chronologically.

5. The forming and/or separating device according to claim 1, wherein the drive (17) is configured to move the two tool parts (14, 15) in a stroke direction (H) toward and away from each other.

6. The forming and/or separating device according to claim 1, wherein the evaluation unit (24) is configured to determine a readiness condition for a supply of an initial workpiece (12) in the forming and/or separating device (10) as a defined operating condition of the forming and/or separating device (10).

7. The forming and/or separating device according to claim 1, wherein the evaluation unit (24) is configured to determine a readiness condition for forming of the initial workpiece (12) into a processed workpiece (13) as a defined operating condition of the forming and/or separating device (10).

8. The forming and/or separating device according to claim 1, wherein the evaluation unit (24) is configured to determine a readiness condition for removal of the processed workpiece (13) out of the forming and/or separating device (10) as a defined operating condition of the forming and/or separating device (10).

9. The forming and/or separating device according to claim 1, wherein the evaluation unit (24) is configured to calculate an indicator value (I) during comparison of the at least one captured image (B) with the at least one reference image (R) and/or the reference model that characterizes a deviation between the at least one captured image (B) and the at least one reference image (R) and/or reference model and to compare the indicator value with a threshold (W).

10. The forming and/or separating device according to claim 9, wherein the evaluation unit (24) is configured to determine a disturbance if the indicator value exceeds the threshold (W).

11. The forming and/or separating device according to claim 1, wherein the evaluation unit (24) is configured to select one image area or multiple image areas in the at least one captured image (B) and to use the image area or the image areas for the comparison with the reference image (R) and/or reference model.

12. The forming and/or separating device according to claim 11, wherein the evaluation unit (24) is configured to calculate a separate indicator value (I) for each image area and to compare it with the threshold (W) or one threshold (W) in each case.

13. The forming and/or separating device according to claim 1, wherein an illumination unit (25) is present that is configured for illuminating the area to be captured by the at least one image (B).

14. The forming and/or separating device according to claim 1, wherein image processing uses machine learning for distinguishing model operation and disturbed operation when comparing the at least one captured image (B) with the reference image or reference model.

15. The forming and/or separating device according to claim 1, wherein at least one condition signal is submitted to the evaluation unit (24) based on which one or multiple of predefined operating conditions are determined, the at least one condition signal is submitted from the control unit (18) and/or at least one additional sensor of the forming and/or separating device (10) to the evaluation unit (24).

16. The forming and/or separating device according to claim 1, wherein the evaluation unit (24) is configured to determine during the cyclic operation of the forming and/or separating device (10) whether the defined operating condition has been reached out of multiple predefined operating conditions of the forming and/or separating device (10), when the forming and/or separating device (10) is in exactly one of the predefined operating conditions at one monitoring point of time and to compare the at least one image (B) captured in the defined operating condition at the one monitoring point of time by the at least one image-capturing sensor (20) with an assigned stored reference image (R) and/or reference model and to check based on the comparison whether a disturbance exists.

17. The forming and/or separating device according to claim 15, wherein each of the at least one condition signal characterizes a distinct point of time within a repeated cycle.

18. A method for operating a forming and/or separating device (10) configured to operate cyclically, the forming and/or separating device (10) comprising:

a first tool part (14) and a second tool part (15), a drive (17) that is configured to move the two tool parts (14, 15) relative to one another in order to process an initial workpiece (12) arranged in a working area (19) between the two tool parts (14, 15), in order to obtain a processed workpiece (13), at least one image-capturing sensor (20) for capturing at least one image (B), an evaluation unit (24) that is communicatively connected with the at least one image-capturing sensor (20), wherein the evaluation unit (24) is configured to determine during operation of the forming and/or separating device (10) whether a defined operating condition of the forming and/or separating device (10) has been reached and to compare the at least one image (B) captured in the defined operating condition by the at least one image-capturing sensor (20) with an assigned stored reference image (R) and/or reference model and to check based on the comparison whether a disturbance exists, wherein in case of an existing disturbance the evaluation unit (24) is configured to create an indication to a control unit (18) of the forming and/or separating device (10) in order to stop the forming and/or separating device (10), wherein the evaluation unit (24) is configured to carry out the capturing of the at least one image (B), the evaluation of the at least one image (B) as well as the creation of an indication to a control unit (18) of the forming and/or separating device (10) and/or a user, whether a disturbance exists, within a predefined maximum duration, and, wherein the maximum duration is the duration that is the most available in order to stop the forming and/or separating device (10) before endangering a person and/or a damage of the forming and/or separating device and/or a tool of the forming and/or separating device and/or a workpiece and/or a transfer device occurs wherein the forming and/or separating device (10) is configured to process the initial workpiece (12) arranged in the working area (19) between the first tool part (14) and the second tool part (15) in order to obtain the processed workpiece (13), wherein the method comprises the following steps:

Determining during operation of the forming and/or separating device (10) whether at least one defined operating condition of the forming and/or separating device (10) has been reached, Capturing at least one image (B) by means of the at least one image-capturing sensor (20), Submitting the at least one captured image (B) to the evaluation unit (24), Comparing the at least one image (B) captured in the defined operating condition by the image-capturing sensor (20) with a reference image (R) assigned to the defined operating condition and/or a reference model assigned to the defined operating condition and determining based on the comparison whether a disturbance exists.

* * * * *